(12) United States Patent
Ramlaoui et al.

(10) Patent No.: US 8,511,973 B2
(45) Date of Patent: Aug. 20, 2013

(54) GUIDE SYSTEM FOR NACELLE ASSEMBLY

(75) Inventors: Jihad I. Ramlaoui, Chula Vista, CA (US); Stephen Michael Roberts, Boulder, CO (US); David Forsey, Poway, CA (US)

(73) Assignee: Rohr, Inc., Chula Vista, CA (US)

( * ) Notice: Subject to any disclaimer, the term of this patent is extended or adjusted under 35 U.S.C. 154(b) by 635 days.

(21) Appl. No.: 12/821,364

(22) Filed: Jun. 23, 2010

(65) Prior Publication Data
US 2011/0318173 A1 Dec. 29, 2011

(51) Int. Cl.
*F01B 25/02* (2006.01)

(52) U.S. Cl.
USPC ............ 415/144; 415/128; 415/145; 415/157; 415/196; 415/211.2

(58) Field of Classification Search
USPC ................ 415/126, 127, 128, 144, 145, 157, 415/182.1, 196, 208.1, 211.2, 218.1, 220
See application file for complete search history.

(56) References Cited

U.S. PATENT DOCUMENTS

| | | | |
|---|---|---|---|
| 3,360,308 A | 12/1967 | Grabowski et al. | |
| 3,404,581 A | 10/1968 | Kraus | |
| 3,747,341 A | 7/1973 | Davis | |
| 3,779,010 A | 12/1973 | Chamay et al. | |
| 3,820,719 A | 6/1974 | Clark | |
| 3,988,889 A * | 11/1976 | Chamay et al. | 60/226.2 |
| 4,026,105 A * | 5/1977 | James | 60/226.2 |
| 4,068,469 A * | 1/1978 | Adamson | 60/204 |
| 4,132,068 A * | 1/1979 | Johnston | 60/226.2 |
| 4,375,276 A | 3/1983 | Konarski | |
| 4,407,120 A | 10/1983 | Timms | |
| 4,519,561 A | 5/1985 | Timms | |
| 4,922,713 A | 5/1990 | Barbarin et al. | |
| 5,228,641 A | 7/1993 | Remlaoui | |
| 5,297,387 A | 3/1994 | Carimali et al. | |
| 5,575,147 A | 11/1996 | Nikkanen | |
| 5,655,360 A | 8/1997 | Butler | |
| 5,778,659 A | 7/1998 | Duesler et al. | |
| 5,806,302 A | 9/1998 | Cariola et al. | |
| 5,960,626 A | 10/1999 | Baudu et al. | |

(Continued)

FOREIGN PATENT DOCUMENTS

| | | | |
|---|---|---|---|
| EP | 0109219 A2 | 5/1984 | |
| EP | 0315524 A1 | 5/1989 | |

(Continued)

OTHER PUBLICATIONS

English translation of Official Action for Chinese Application No. 200880102315.X, dated Sep. 25, 2012, 32 pgs.

(Continued)

*Primary Examiner* — Igor Kershteyn
(74) *Attorney, Agent, or Firm* — Snell & Wilmer L.L.P.

(57) ABSTRACT

A guide system for translating components of an aircraft engine nacelle includes a track assembly and a slider assembly. The track assembly includes a track guide member having a track channel. The slider assembly translatably engages the track assembly. The slider assembly includes a slider body configured to be received within the track channel. The slider assembly further includes a slider arm member pivotably coupled to the slider body with a hinge joint disposed within the track channel. The slider arm member extends from the body portion and outwardly of the track assembly. Associated apparatuses are also provided.

20 Claims, 12 Drawing Sheets

(56) References Cited

U.S. PATENT DOCUMENTS

| | | | |
|---|---|---|---|
| 5,996,937 | A | 12/1999 | Gonidec et al. |
| 6,079,201 | A | 6/2000 | Jean |
| 6,167,694 | B1 | 1/2001 | Davies |
| 6,170,254 | B1 | 1/2001 | Cariola |
| 6,474,059 | B2 | 11/2002 | Stretton |
| 6,681,559 | B2 | 1/2004 | Johnson |
| 6,845,945 | B1 | 1/2005 | Smith |
| 6,968,675 | B2 | 11/2005 | Ramlaoui et al. |
| 6,976,352 | B2 | 12/2005 | Lair |
| 7,174,828 | B2 | 2/2007 | Davies et al. |
| 8,006,479 | B2 | 8/2011 | Stern |
| 8,104,261 | B2 | 1/2012 | Marshall et al. |
| 2004/0079073 | A1 | 4/2004 | Ramlaoui et al. |
| 2007/0294996 | A1 | 12/2007 | Stephan et al. |
| 2008/0084130 | A1 | 4/2008 | Darby et al. |
| 2009/0013664 | A1 | 1/2009 | Jones et al. |
| 2009/0053058 | A1 | 2/2009 | Kohlenberg et al. |
| 2009/0288386 | A1 | 11/2009 | Marshall et al. |
| 2010/0031630 | A1 | 2/2010 | Bulin et al. |
| 2010/0139242 | A1 | 6/2010 | Vauchel et al. |
| 2010/0192715 | A1 | 8/2010 | Vauchel et al. |
| 2010/0205931 | A1 | 8/2010 | Baudu et al. |
| 2010/0229527 | A1 | 9/2010 | Amkraut et al. |
| 2010/0229528 | A1 | 9/2010 | Ramlaoui et al. |

FOREIGN PATENT DOCUMENTS

| | | | |
|---|---|---|---|
| EP | 0779429 | A2 | 6/1997 |
| EP | 1052427 | A2 | 11/2000 |
| EP | 1878904 | A2 | 1/2008 |
| EP | 2050948 | A2 | 4/2009 |
| EP | 1978231 | B1 | 2/2012 |
| FR | 2866020 | A1 | 12/2005 |
| FR | 2917788 | A1 | 6/2007 |
| FR | 2921976 | A1 | 10/2007 |
| FR | 2922059 | A1 | 10/2007 |
| FR | 2912189 | A1 | 8/2008 |
| GB | 925010 | A | 5/1963 |
| GB | 2285020 | A | 6/1995 |
| WO | 02/103189 | A1 | 12/2002 |
| WO | 2005082771 | A1 | 9/2005 |
| WO | 2008045056 | A1 | 4/2008 |
| WO | 2009029401 | A2 | 3/2009 |

OTHER PUBLICATIONS

Official Action for Chinese Application No. 201010206330.8, dated Oct. 8, 2012, 6 pgs.
English translation of Official Action for Chinese Application No. 201010206330.8, dated Oct. 8, 2012, 8 pgs.
Official Action for Chinese Application No. 201010156573.5, dated Oct. 10, 2012, 6 pgs.
English translation of Official Action for Chinese Application No. 201010156573.5, dated Oct. 10, 2012, 8 pgs.
Official Action for U.S. Appl. No. 12/419,080, dated Dec. 7, 2012, 8 pgs.
Official Action for Chinese Application No. 201010206302.6, dated Nov. 5, 2012, 12 pgs.
English translation of Official Action for Chinese Application No. 201010206302.6, dated Nov. 5, 2012, 16 pgs.
Official Action (U.S. Appl. No. 12/057,497), dated Sep. 28, 2011, 9 pgs.
Official Action (EP App. No. 08251152.8), dated Jul. 7, 2010, 6 pgs.
EP Search Report (EP App. No. 10002809.1), dated Nov. 21, 2011, 5 pgs.
European Search Report (EP 10005250), dated Jan. 25, 2012, 5 pgs.
European Search Report dated Jan. 23, 2012 (EP Application No. 10005249), 5 pgs.
Official Action for U.S. Appl. No. 12/419,080, dated Mar. 23, 2012, 12 pgs.
Official Action for U.S. Appl. No. 12/057,497, dated Feb. 2, 2012, 17 pgs.
Official Action for U.S. Appl. No. 12/485,559, dated Jun. 12, 2012, 15 pgs.
Official Action for U.S. Appl. No. 12/485,551, dated Jun. 27, 2012, 18 pgs.
Official Action of U.S. Appl. No. 12/419,080, dated Aug. 1, 2012, 8 pgs.
Slider Track Design Nos. 1-5, known as of Jun. 22, 2010, pp. 1-2.

* cited by examiner

GUIDE SYSTEM FOR NACELLE ASSEMBLY

TECHNICAL FIELD

The present invention generally relates to gas turbine aircraft engines, and particularly relates to a guide system for a translating thrust reverser and a translating variable area nozzle assembly for a turbofan aircraft engine for use in selectively controlling the fan bypass flow exhausted from the engine in order to adjust the engine's performance under varying flight conditions.

BACKGROUND

Typical aircraft turbofan jet engines include a fan that draws and directs a flow of air into a nacelle and into and around an engine core. The nacelle surrounds the engine core and helps promote the laminar flow of air around the core. The flow of air that is directed into the engine core is initially passed through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle at the rear of the engine.

Bypass flow is air that is directed around the engine core. In turbofan engines, the bypass flow typically provides the main thrust for an aircraft. The bypass flow also can be used to help slow a landed aircraft. Translatable thrust reversers mounted in the nacelle structure selectively reverse the direction of the bypass flow to generate reverse thrust. The thrust reverser is translatable via a guide system directed by an actuation device.

Several turbofan engine parameters are important to optimize design characteristics and performance. One design consideration for optimizing such parameters includes varying the fan nozzle exit area of a high-bypass ration (BPR) engine during operation by translating the engine's variable fan nozzle to optimize engine performance under various flight conditions. By selectively varying the fan nozzle's exit area, an engine's bypass flow characteristics can be adjusted to match a particular flight condition. One way of varying the fan nozzle exit area involves using a translating sleeve to increase or decrease the exit area. Providing a translating sleeve requires a guide system that properly considers surrounding reacting loads (inboard and outboard) and efficiently manages contact stresses. Also, translating guide systems require a design to minimize seizing of translating components during use.

Accordingly, a need exists for a guide system for a thrust reverser and/or a variable area nozzle assembly for turbofan aircraft engine that is capable of reacting to inboard loads, as well as outboard loads and radial loads, and effectively managing contact stresses, while minimizing the potential to seize during use.

SUMMARY

The invention includes a guide system for translating components of an aircraft engine nacelle. The guide system includes a track assembly adapted to operably engage a first portion of a nacelle. The track assembly includes a track guide member having a track channel. The guide system further includes a slider assembly configured to translatably engage the track assembly. The slider assembly includes a slider body configured to be received within the track channel. The slider assembly further includes a slider arm member pivotably coupled to the slider body with a hinge joint disposed within the track channel. The slider arm member extends from the body portion and outwardly of the track assembly.

The invention also includes a nacelle for a turbofan aircraft engine. The nacelle includes a first nacelle portion. The nacelle further includes a track assembly adapted to operably engage the first nacelle portion. The track assembly includes a track guide member having a track channel. The nacelle further includes a slider assembly configured to translatably engage the track assembly. The slider assembly includes a slider body configured to be received within the track channel. The slider assembly further includes a slider arm member pivotably coupled to the slider body with a hinge joint disposed within the track channel. The slider arm member extends from the body portion and outwardly of the track assembly. A second nacelle portion is operably engaged with the slider arm member of the slider assembly.

In another embodiment, a nacelle includes a stationary first nacelle portion. A stationary track assembly is operably engaged with the stationary first nacelle portion. The track assembly includes a track guide member having a track channel. The nacelle further includes means for slidably engaging one of a translatable variable area fan nozzle section and a translatable thrust reverser sleeve to the stationary track assembly. The nacelle further includes means for pivoting, within the track channel, the means for slidably engaging the one of a translatable variable area fan nozzle section and a translatable thrust reverser sleeve to the stationary track assembly. The nacelle further includes means for actuating the means for slidably engaging the one of a translatable variable area fan nozzle section and a translatable thrust reverser sleeve.

These and other features, aspects, and advantages of the invention will be apparent from a reading of the following detailed description together with, the accompanying drawings, which are briefly described below.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

FIGS. 1-6 show one embodiment of a translating variable area fan nozzle assembly (VAFN) for a turbofan engine 10.

Figure 1:
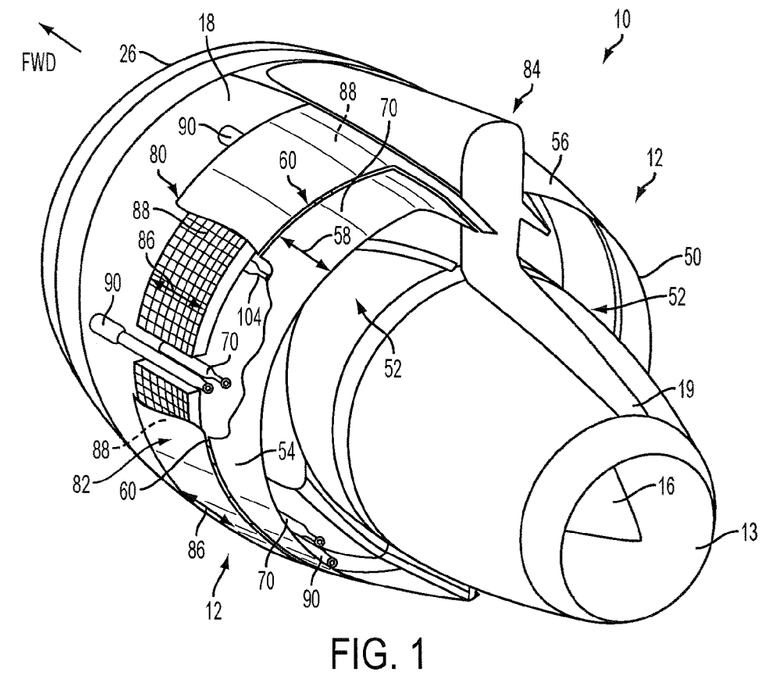
FIG. 1 is a perspective view of an aircraft engine having a cascade-type thrust reverser and a translating variable area fan nozzle assembly and being capable of implementing embodiments of the present invention.
Figure 2:
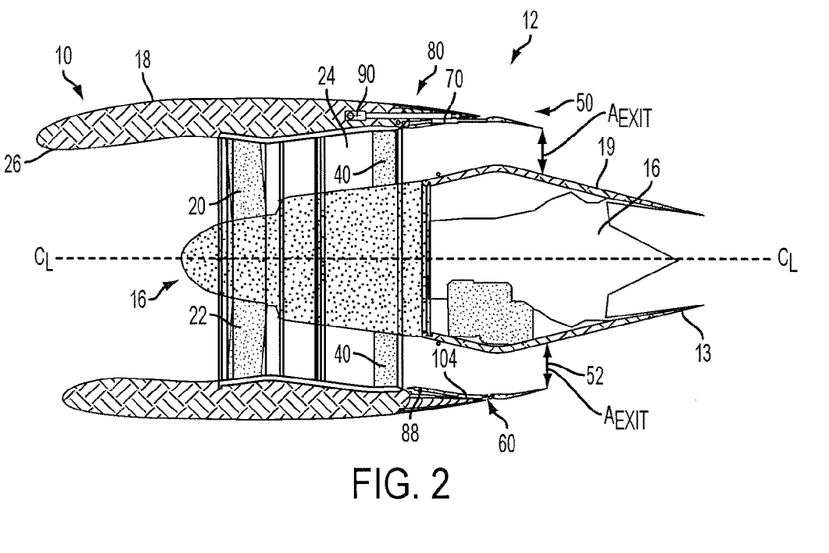
FIG. 2 is a longitudinal cross section of the aircraft engine shown in FIG. 1.

Referring to FIGS. 1 and 2, the engine 10 includes a fan nozzle assembly 12 having a translating nozzle 50 that can be selectively adjusted, for example, as the engine 10 operates under different flight conditions. As discussed above, such an adjustment can be used to optimize an engine's performance. As shown in FIG. 2, the translating nozzle 50 can be selectively translated (i.e., moved fore and aft) to vary the fan nozzle's exit area "$A_{exit}$" in order to optimize engine performance, and as described in detail below, to adjust an amount of engine bypass flow spilled through an upstream exit 60 formed by the variable area fan nozzle assembly 12. By bleeding or spilling off excess fan flow through the upstream exit 60 before the excess air flow reaches the primary fan nozzle exit 52, lower fan pressure ratios for the same amount of delivered mass flow can be obtained, thereby increasing stall margins and avoiding engine non-optimal performance. For purposes of illustration, the variable area fan nozzle assembly 12 is shown in the context of a turbofan jet aircraft engine 10. The engine 10 can be mounted to a wing or fuselage of an aircraft, for example, by a pylon or other similar support (not shown in the figures).

As shown in FIG. 2, the engine 10 includes an engine core 16 and a stationary nacelle 18 surrounding the core 16. The engine core 16 is housed within a core cowl 19. The engine's fan 20 is positioned within an upstream portion of the nacelle 18, and includes a plurality of fan blades 22 that are mounted on the engine's rotor (not shown). The fan blades 22 rotate about the engine's centerline $C_L$ and draw a flow of air into an inlet end 26 of the engine 10. An annular bypass duct 24 is defined between the engine core 16 and the nacelle 18. The air flow drawn into the engine 10 is accelerated by the rotating fan blades 22, and a portion of the incoming air flow is directed into and through the engine core 16.

Bypass flow enters the upstream end of the nacelle 18 and flows around and past the engine core 16. The bypass flow is accelerated by the rotating fan blades 22 and passes through the bypass duct 24 and past stators 40, and exits the engine 10 through the variable area fan nozzle assembly 12. The high-pressure heated exhaust gases from the combustion of the fuel and air mixture exit the engine core 16 through a primary exhaust nozzle 13 at the aft end of the engine 10.

Figure 3:
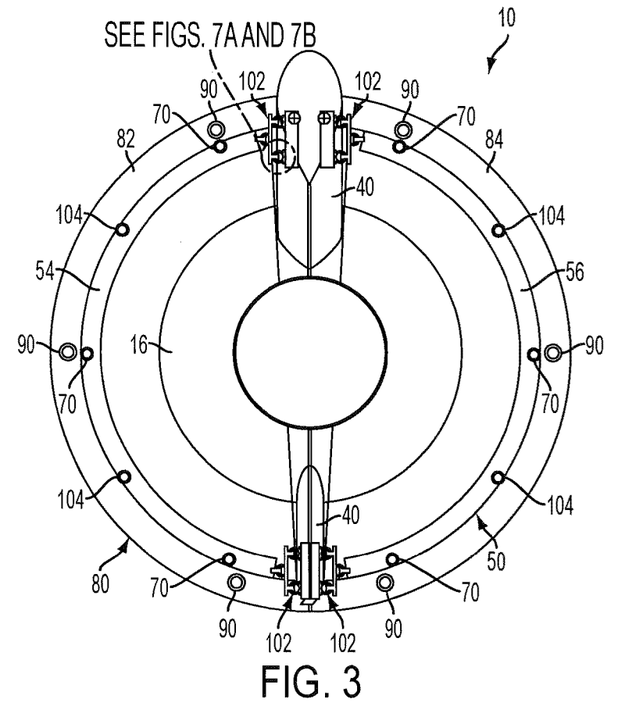
FIG. 3 is a rear elevation view of the aircraft engine shown in FIGS. 1-2.

In the engine assembly 10 shown in FIGS. 1-6, the translating nozzle 50 can be a nozzle-like annular airfoil structure mounted at the trailing end of a cascade-type thrust reverser 80 that circumscribes the engine core cowl 19 immediately aft of the nacelle 18. As shown in FIG. 2, a downstream nozzle exit 52 between the trailing edge of the fan nozzle 50 and the core cowl 19 defines a fan nozzle exit area "$A_{exit}$". Due to the longitudinal variations in the diameter of the core cowl 19, selective fore and aft movement of the translating nozzle 50 changes the size of the fan nozzle exit area $A_{exit}$. As shown in FIG. 1, the fan nozzle 50 can include a first arcuate nozzle section 54 and a second arcuate nozzle section 56, each nozzle section 54, 56 being axially translatable in the direction of the bidirectional arrow 58. Translation of the translating nozzle 50 effects a desired size of the upstream exit 60, and also varies the outlet geometry and effective exit area $A_{exit}$ of the downstream nozzle exit 52. Hence, when the translating nozzle 50 is deployed (or moved) in the aft direction, bypass air is discharged from the engine assembly 10 through both the upstream exit 60 and the enlarged downstream nozzle exit 52. As shown in FIGS. 1-3, the translating nozzle 50 can be selectively translated fore and aft by a plurality of linear nozzle actuators 70, for example.

The cascade-type thrust reverser 80 can be positioned forward of the translating nozzle 50 in order to selectively block and redirect bypass flow from the bypass duct 24 in a manner known in the art. In FIG. 1, the thrust reverser 80 and the translating nozzle 50 are both in their stowed positions. As shown in FIG. 1, the thrust reverser 80 can include a first arcuate sleeve section 82 and an opposed second arcuate sleeve section 84 (shown in FIG. 3). As indicated by bi-directional arrow 86 in FIG. 1, the thrust reverser sleeve sections 82, 84 can be translated in the fore and aft directions by a plurality of spaced sleeve actuators 90. In a stowed position, the thrust reverser sleeve sections 82, 84 cover an array of cascade vanes 88. The cascade vanes 88 are indicated under the cut-away section of the sleeve section 82. Axial translation of the thrust reverser sleeve sections 82, 84 in the aft direction to a deployed position and deployment of a series of blocker doors (not shown) within the bypass duct 24 causes bypass air flow to exit the bypass duct 24 through the cascade vanes 88 which turn the exiting flow in a generally forward direction to create reverse thrust.

FIG. 3 is a partial section view of the aft end of the engine 10, and illustrates one arrangement of the nozzle and sleeve actuators 70, 90, respectively, around the periphery of the engine 10. As shown in FIG. 1, and more clearly in FIG. 3, the sleeve half section 82 and the nozzle half-section 54 cooperate to generally define an approximately 180-degree sector of the combined thrust reverser and translating nozzle structure. Likewise, sleeve half section 84 and nozzle half section 56 cooperate to generally define an opposed approximately 180-degree sector of the thrust reverser and translating nozzle structure. Together, these approximate 180-degree sectors cooperate to define the complete thrust reverser/translating nozzle structure.

As shown in FIGS. 1-3, the thrust reverser sleeve sections 82, 84 can each be selectively translated in the fore and aft directions by one or more circumferentially spaced sleeve actuators 90 that are connected to the nacelle 18. In the embodiment shown, three actuators 90 are used for each sleeve half-section 82, 84. As discussed above, each section 54, 56 of the translating nozzle 50 can be selectively translated by one or more circumferentially spaced nozzle actuators 70. In the embodiment shown, each nozzle actuator 70 is disposed between a thrust reverser sleeve section 82, 84 and a respective fan nozzle section 54, 56. The sleeve actuators 90 and the nozzle actuators 70 can be electrical, mechanical, pneumatic, hydraulic, or the like, and can be interconnected by appropriate power cables and conduits (not shown). The number and arrangement of nozzle and sleeve actuators 70, 90 can vary according to the thrust reverser and nozzle assembly configurations or other factors.

As shown in FIG. 3, the nozzle sections 54, 56 can be movably mounted on the engine 10 by upper and lower guide systems 102. FIG. 7, as will be discussed below, shows a detailed view of one embodiment of a guide system 102.

As shown in FIGS. 1-3, guide tubes 104 can be mounted to the nacelle 18, and can extend into the nozzle sections 54, 56 to stabilize the nozzle sections 54, 56 against undesirable translation and/or vibration. The guide tubes 104 can each include an elongated slider that translates within the tube (not shown in the figures), for example.

As shown in FIG. 3, the translating nozzle 50 can include two arcuate nozzle sections (e.g., nozzle sections 54, 56) having airfoil profiles. The upstream exit 60 shown in FIG. 2 is formed when the translating nozzle 50 is deployed in the aft direction (i.e., away from the fixed thrust reverser sleeve sections 82, 84), and can have the form of a generally circular annular gap. Alternatively, the upstream exit 60 can have a non-circular shape. The gap 60 between the nozzle sections 54, 56 and the sleeve sections 82, 84 can be continuous, or can be interrupted at one or more locations, such as, for example, at points of separation between nozzle segments 54, 56 of the translating nozzle 50.

The translating nozzle 50 and surrounding structure are described below with reference to FIGS. 4-7. In FIGS. 4-7, elements that are obscured or partially obscured due to intervening elements are indicated by dashed lead lines.

Figure 4:
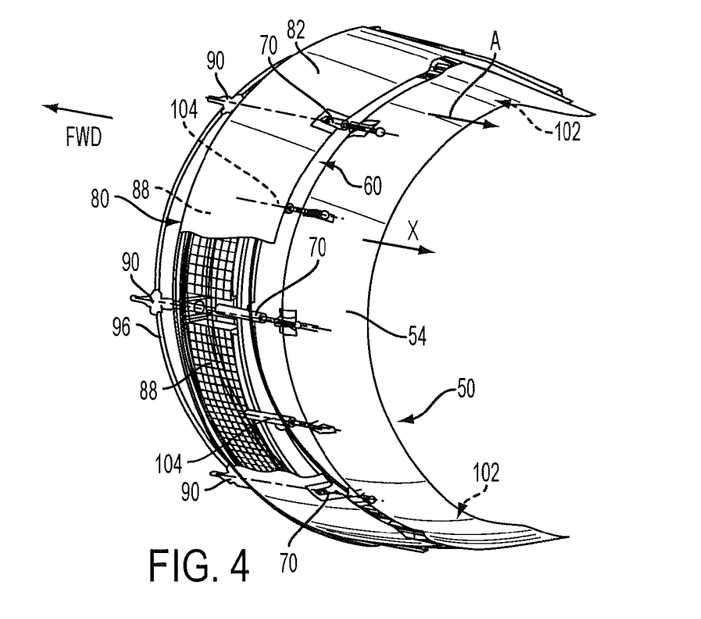
FIG. 4 is a perspective view of the thrust reverser and translating variable area fan nozzle assembly portions of the aircraft engine shown in FIGS. 1-3 with a thrust reverser sleeve in a stowed position, and a variable area fan nozzle in a deployed position.
Figure 5:
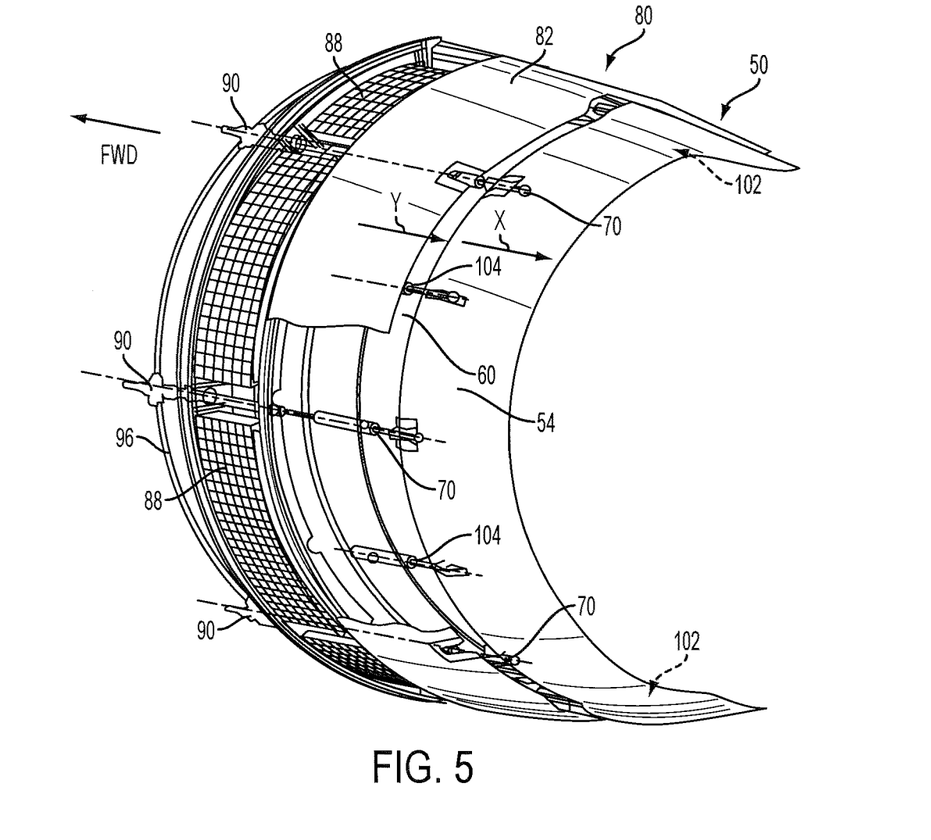
FIG. 5 is a perspective view of the thrust reverser and translating variable area fan nozzle assembly shown in FIG. 4 with both the thrust reverser sleeve and the variable area fan nozzle in deployed positions.

FIG. 4 is a partial view of one embodiment of a mounting structure for a first nozzle section 54 of the translating nozzle 50 and the corresponding, adjacent first sleeve section 82 of the thrust reverser 80. The second nozzle section 56 of the translating nozzle 50 and the second sleeve section 84 of the thrust reverser 80 (not shown in FIG. 4) can be mounted in a similar manner. In FIG. 4, the thrust reverser 80 is in a stowed position, and the first sleeve section 82 covers an associated portion of the cascade vanes 88. Also in FIG. 4, the translating nozzle 50 is in an open or deployed position, which results in formation of the upstream exit 60 between the first nozzle section 54 and the first sleeve section 82. Rearward axial translation of the first nozzle section 54 from its stowed position to its deployed position is indicated in FIGS. 4-5 by directional arrow "X". As shown in FIG. 4, the nozzle actuators 70 can extend from the sleeve section 82 and across the upstream exit 60, and can connect to a forward portion of the nozzle section 54. The guide tubes 104 can also extend from the sleeve section 82 and across the upstream exit 60, and can connect to a forward portion of the nozzle section 54. A flexible shaft 96 can interconnect two or more of the sleeve actuators 90 to power the actuators 90, and/or to synchronize actuation of two or more actuators 90.

FIG. 5 shows the first thrust reverser sleeve section 82 and the first translating nozzle section 54 in their deployed positions, for illustrative purposes. Rearward axial translation of the first sleeve section 82 from its stowed position (as shown in FIG. 4) to its deployed position (as shown in FIG. 5) is indicated in FIG. 5 by directional arrow "Y". Rearward translation of the sleeve section 82 exposes the cascade vanes 88 during operation of the thrust reverser 80.

Figure 6:
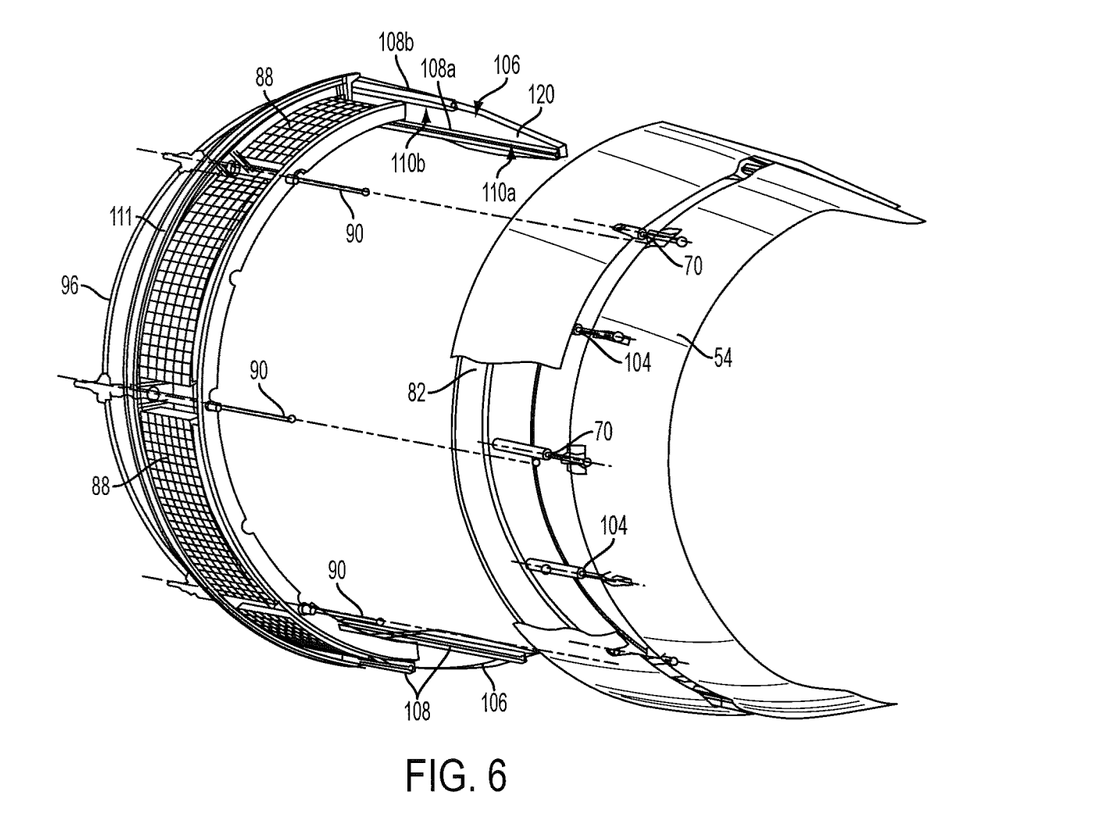
FIG. 6 is an exploded perspective view of the thrust reverser and translating variable area fan nozzle assembly shown in FIGS. 4-5.

FIG. 6 is an exploded view showing the first sleeve section 82 and its corresponding first nozzle section 54 separated from the cascades 88 and sleeve actuators 90. As shown in FIG. 6, one or more nozzle actuators 70 can movably connect the nozzle section 54 to the thrust reverser sleeve section 82.

Figure 7A:
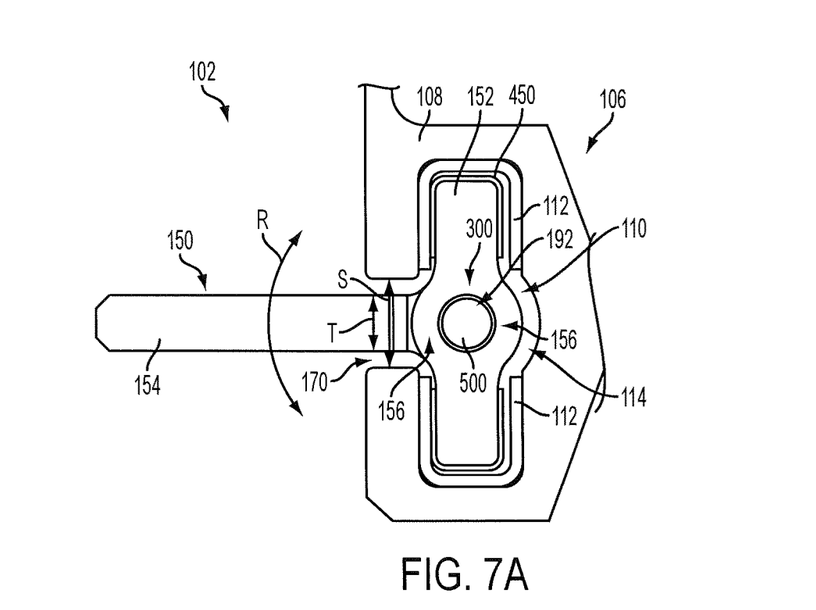
FIGS. 7A and 7B are cross sectional views of a guide structure for movably supporting a thrust reverser sleeve or a variable area fan nozzle section, according to various embodiments of the present invention.
Figure 7B:
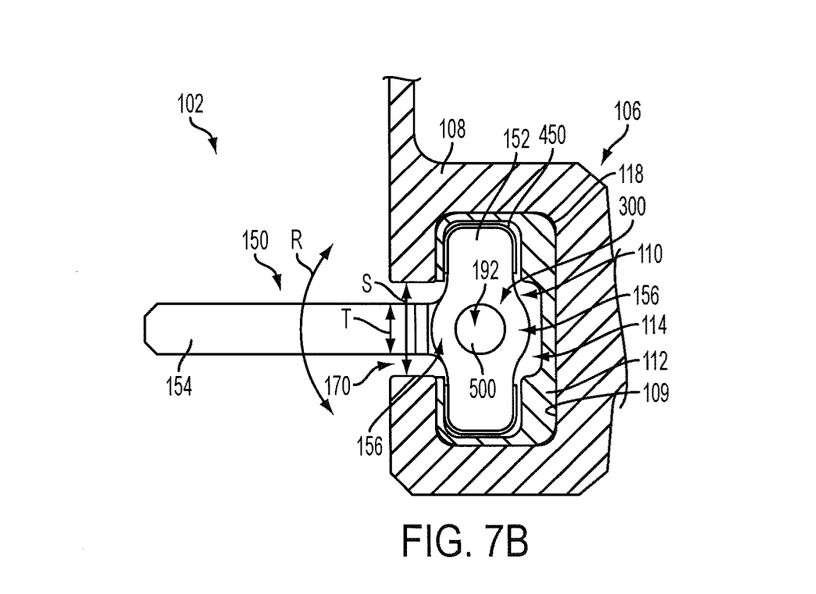

FIGS. 7A and 7B show various embodiments of the upper or lower guide system 102 for movably connecting a thrust reverser segment 82 or a nozzle section 54 to a nacelle 18 of an engine 10. In general, the guide system 102 can include a track assembly 106 and a slider assembly 150. Either assembly can be held stationary while the other translates, although the track assembly 106 is stationary in a preferred embodiment. Referring generally to FIG. 3 and FIG. 6 and particularly to FIG. 7, the guide system 102 can include the track assembly 106 coupled to a beam 120 that can be fixedly attached to a transverse bulkhead 111 on an aft end of the nacelle 18. As shown in FIG. 6, the track assembly 106 can include one or more longitudinally extending track guide members 108, such as, for example, a primary track guide member 108*a* and a supplemental track guide member 108*b*. Each track guide member 108 can define a longitudinally extending track channel 110, such as, for example, a primary track channel 110*a* and a supplemental track channel 110*b*. The primary track guide member 108*a* and the supplemental track guide member 108*b* may be arranged in parallel so as to facilitate corresponding translation of slider assemblies engaged therewith.

Figure 9:
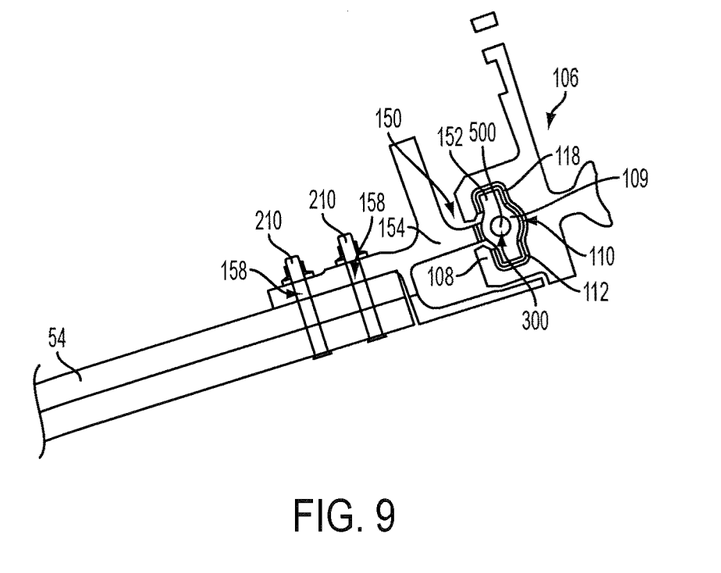
FIG. 9 is a cross sectional view of a portion of a variable area fan nozzle section coupled to a guide system in accordance with one embodiment of the present invention.
Figure 10:
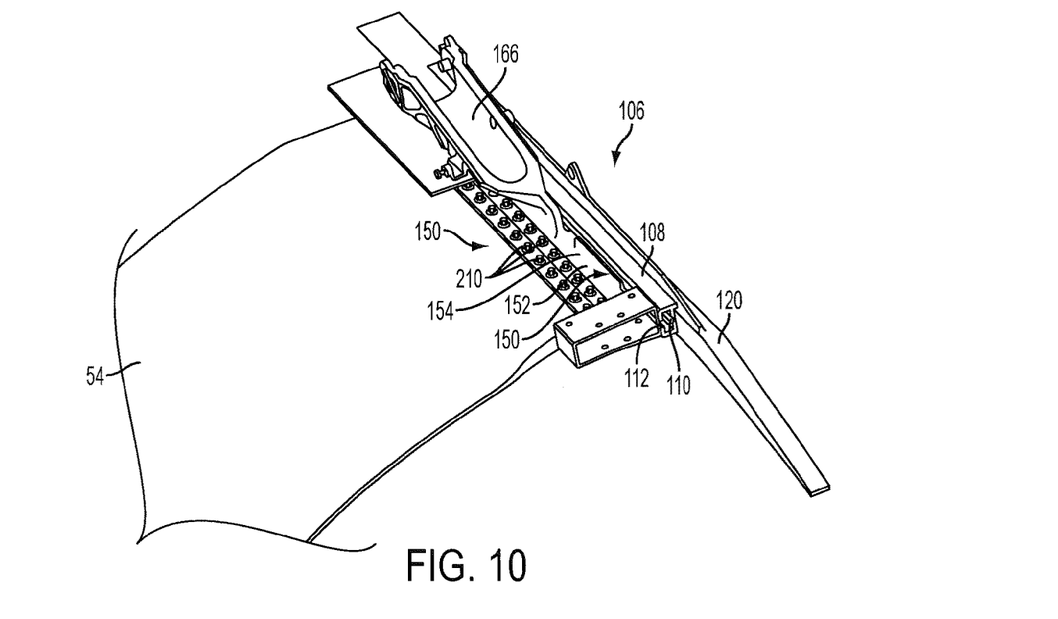
FIG. 10 is a perspective view of a portion of a variable area fan nozzle section coupled to a guide system in accordance with one embodiment of the present invention.
Figure 11:
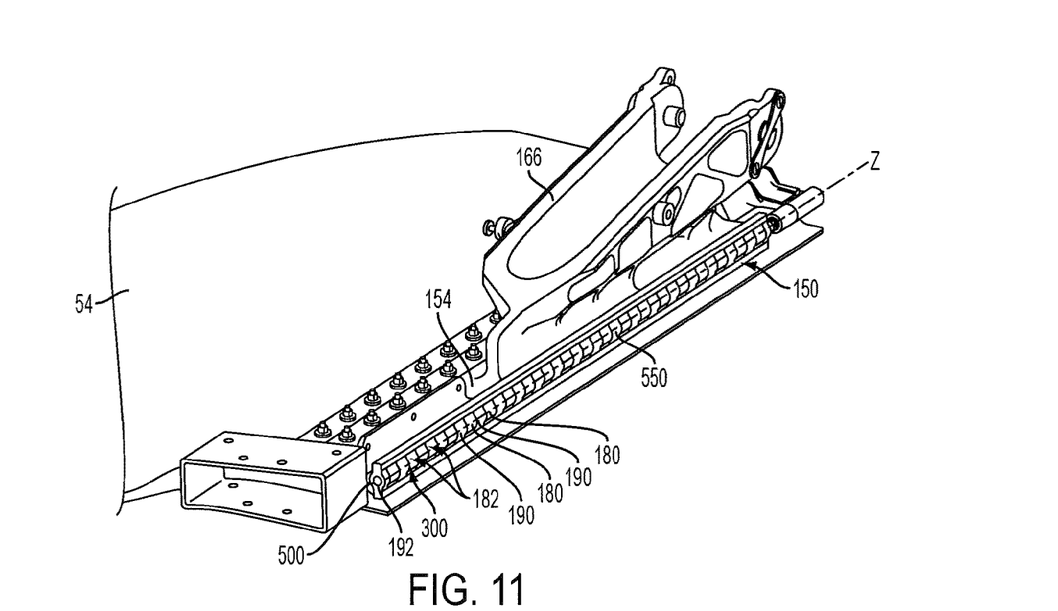
FIG. 11 is a perspective view of a portion of a variable area fan nozzle section coupled to a slider assembly of a guide system in accordance with one embodiment of the present invention.

With reference to FIGS. 7A and 7B, the guide system 102 can further include the slider assembly 150 configured to slidably engage the track assembly 106. The slider assembly 150 can include one or more longitudinally extending slider bodies 152 that are slidably received within the track channels 110 of the track assembly 106. A slider arm member 154 may be coupled, connected, or otherwise operably engaged with the slider body 152 at a hinge joint 300, wherein the slider arm member 154 extends outwardly of the track assembly 106. The slider assembly 150 may be connected to the thrust reverser sleeve section 82 (FIGS. 3-5) so as to slidably connect the sleeve section to the beam 120. In other embodiments, as shown in FIGS. 9-11, the slider assembly 150 may be connected to the nozzle section 54 to slidably connect the nozzle section 54 to the nacelle 18 (FIGS. 1 and 2). Accordingly, the nozzle section 54 or the thrust reverser sleeve section 82 can axially translate as the slider member 152 slides within the track channel 110. The nozzle section 54 can be thereby slidably mounted with respect to the sleeve section 82 of the thrust reverser 80.

The translating sleeve section 82 or the translating nozzle section 54 can be actuated through conventional actuation means, such as mechanical, electric, hydraulic or pneumatic or other equivalent actuators, for example. In one embodiment, the nozzle actuator 70 is a constant opening air spring damper with hydraulic closing override, and the sleeve actuator 90 is an electric actuator. Alternatively or in addition, one or more of the actuators 70, 90 can be like an actuator described in U.S. Pat. No. 7,174,828 or in U.S. Patent Application Publication No. 2008/0084130A1, both assigned to Goodrich Actuation Systems Ltd., for example, the disclosures of which are hereby incorporated by reference.

Figure 8:
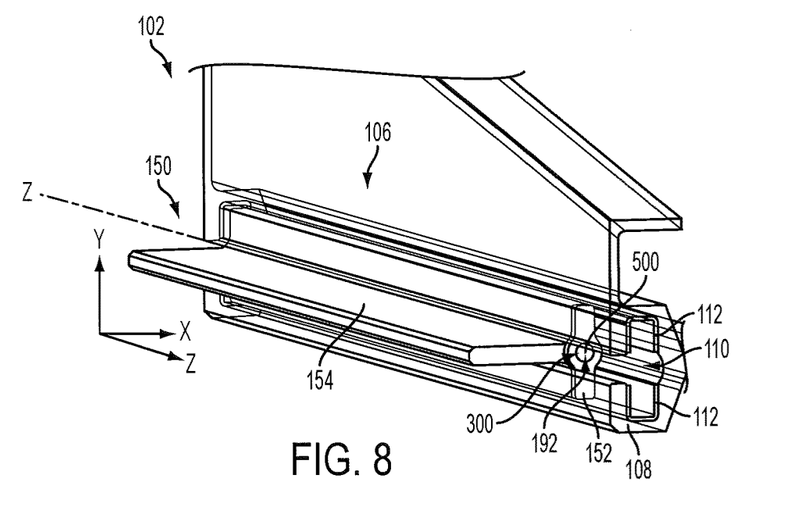
FIG. 8 is a perspective view of the guide system shown in FIG. 7A.
Figure 12A:
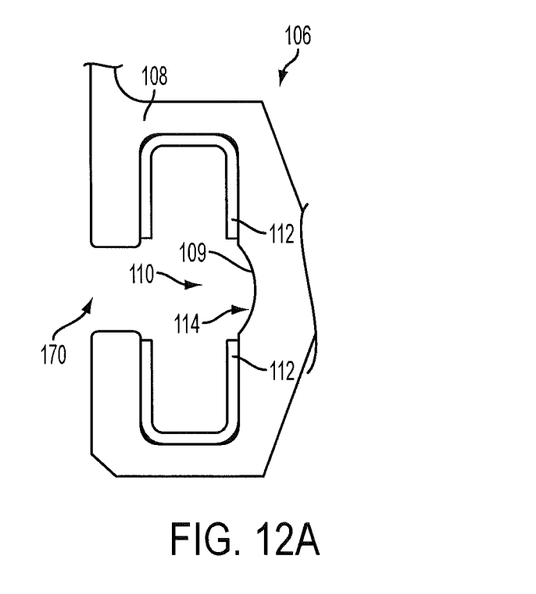
FIG. 12A is an end view of a track assembly of a guide system in accordance with one embodiment of the present invention.
Figure 12B:
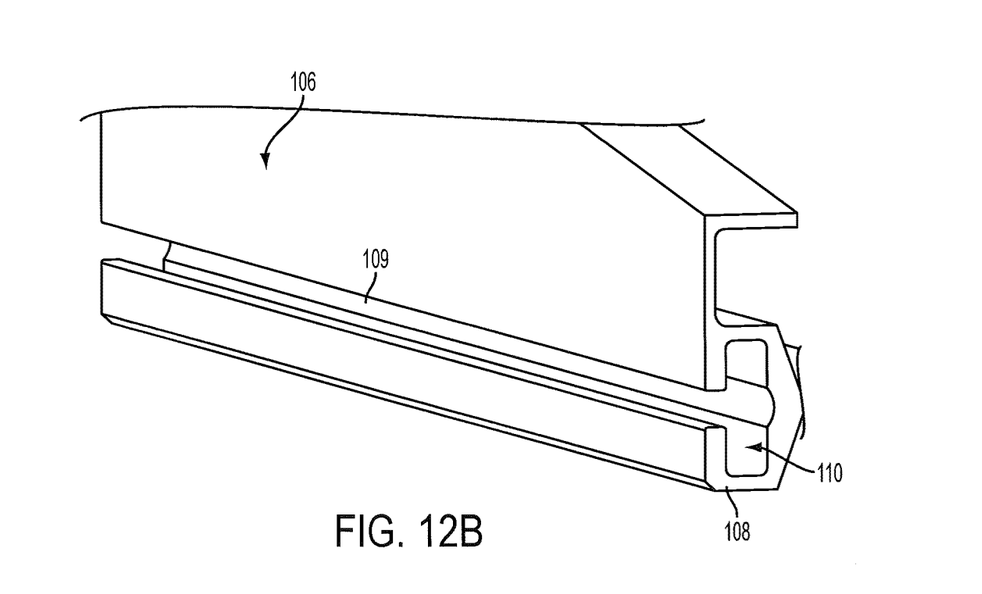
FIG. 12B is a perspective view of a portion of a track assembly of a guide system with a track liner member removed therefrom.

With continuing reference to FIGS. 7A and 7B, as well as FIGS. 8-10, there is shown the guide system 102 according to various embodiments of the present invention. According to such embodiments, the track assembly 106 includes the track guide member 108, which includes the track channel 110. The track assembly 106 can further include one or more track liner members 112 disposed within the track channel 110, wherein the track liner member 112 may be permanently or temporarily fixed to the track guide member 108 using appropriate methods, e.g., fasteners, adhesives, interference fit, etc. Alternatively, the track liner member 112 may be integrally formed with the track guide member 108 as a single unitary piece. According to an embodiment, as shown in FIGS. 7A, 8, and 12A, the track liner member 112 may include a plurality of track liner members 112. In some instances, the track liner members 112 may be provided about opposing portions of the track channel 110 and not entirely covering the track channel 110. In this regard, the track liner members 112 may be configured so as to prevent the uncovered portions of the track channel 110 from interacting with the slider body 152.

According to another embodiment, as shown in FIGS. 7B and 9, a single track liner member 112 may be provided, which may be permanently or temporarily fixed to the track guide member 108 using appropriate methods, e.g., fasteners, adhesives, interference fit, etc. In any instance, and with reference to FIGS. 7A, 7B, 8, and 9, an exterior surface 118 of the track liner member 112 may substantially correspond with an interior surface 109 of the track guide member 108. In one instance, the track liner member 112 may be substantially U-shaped. The track liner member 112 may be correspondingly shaped in accordance with at least a portion of the slider body 152. The track guide member 108 is open-ended and includes an elongated opening or slot 170 such that the slider arm member 154 can extend therethough.

Figure 16A:
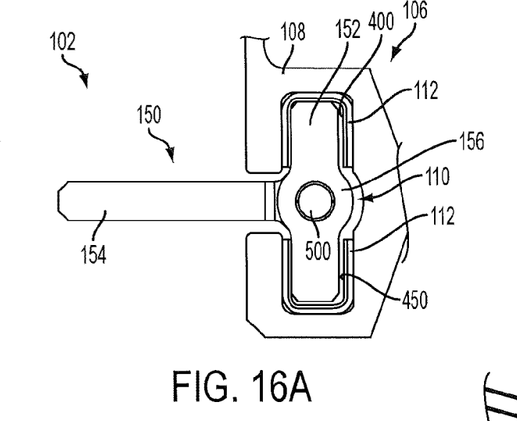
FIGS. 16A-16D are various views of a guide system and its components according to another embodiment of the present invention, wherein the guide system includes a slider assembly and a track assembly having a bearing layer applied thereto.
Figure 16B:
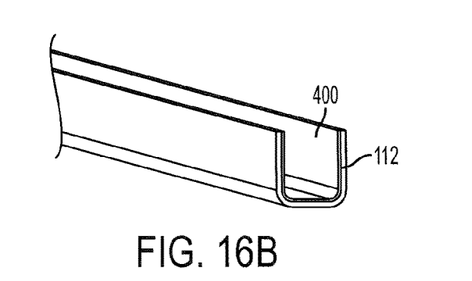
Figure 16C:
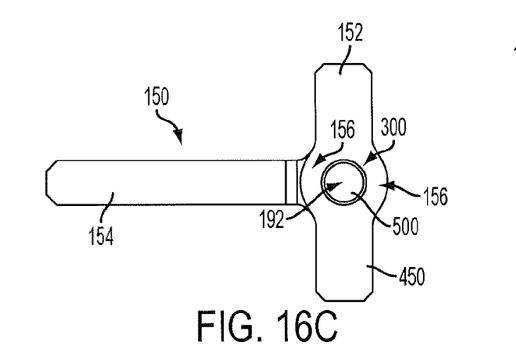

The interior surface of the track liner member 112 may be smooth to provide a sliding surface, and, in some instances, the interior surface may have a hard coating applied thereto for improving durability. Preferred materials for the track liner member may include, for example, aluminum and steel, and preferred coatings include aluminum oxide formed during hard anodizing (aluminum applications). In some instances, as shown in FIGS. 16A and 16B, a track bearing layer 400 may be applied to the interior surface of the track liner member 112 to facilitate sliding of the slider assembly 150 or the track assembly 106 (FIGS. 16A and 16B). In such instances, the slider member 152 may or may not include a slider bearing layer 450 (FIGS. 7A, 7B, 15A, and 15C). The track bearing layer 400 and slider bearing layer 450 may comprise a low friction bearing material such as, for example, self-lubricating liner systems such as KARON (available from Kamatics Corporation), durable high-performance polymide-based polymers such as VESPEL (available from DuPont), and self-lubricating composites such as RULON (available from Saint-Gobain Performance Plastics).

Referring to FIGS. 7A and 7B, the slider assembly 150 can include the slider body 152 and the slider arm member 154 extending therefrom. The slider body 152 is disposed within the track channel 110 and the slider arm member 154 extends outwardly of the track assembly 106 through the elongate slot 170. The width S of the slot 170 is greater than the thickness T of the slider arm member 154 so as to allow rotation thereof, with respect to the slider body 152, along an arcuate path R. According to one embodiment, the slider arm member 154 may rotate between about +/−5 degrees with respect to a longitudinal axis Z (FIG. 8) of the track guide member 108. The slider arm member 154 may include a plurality of apertures 158 for receiving fasteners 210 (FIG. 9) to couple the slider assembly 150 to a portion of the nacelle 18 (e.g., the nozzle section 54). The slider body 152 substantially corresponds to the track liner member 112, wherein the slider body 152 has a substantially rectangular cross-section. In this regard, the slider body 152 and the slider arm member 154 combine to provide a substantially T-shaped cross-section. In some instances, the slider body 152 may include a pair of convex portions 156, and the track guide member 108 may include a longitudinally extending recess 114 configured to accommodate the convex portions 156.

The exterior surface of the slider body 152 may be smooth to provide a sliding surface, and, in some instances, the exterior surface may have a hard coating applied thereto for improving durability. Preferred materials for the slider body may include, for example, aluminum, steel, titanium, and preferred coatings include aluminum oxide formed during hard anodizing (aluminum applications). In some instances, the slider assembly 150 may further include an actuator fitting assembly 166 (FIGS. 10 and 11) attached to or otherwise integral with the slider arm member 154, wherein the actuator fitting assembly 166 is configured to receive an actuator device capable of translating the slider assembly 150 in the fore and aft directions, as previously described.

Figure 15A:
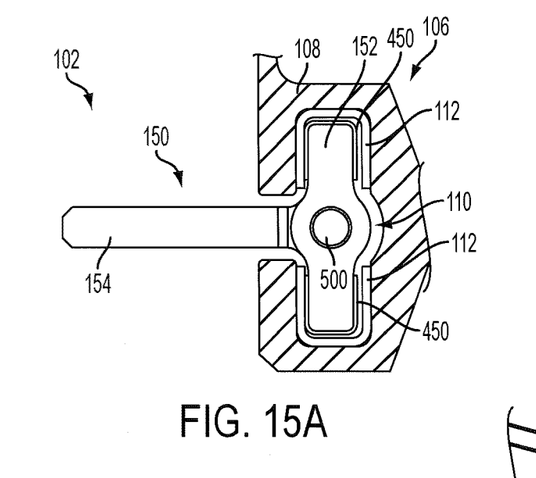
FIGS. 15A-15D are various views of a guide system and its components according to one embodiment of the present invention, wherein the guide system includes a track assembly and a slider assembly having a bearing layer applied thereto.
Figure 15B:
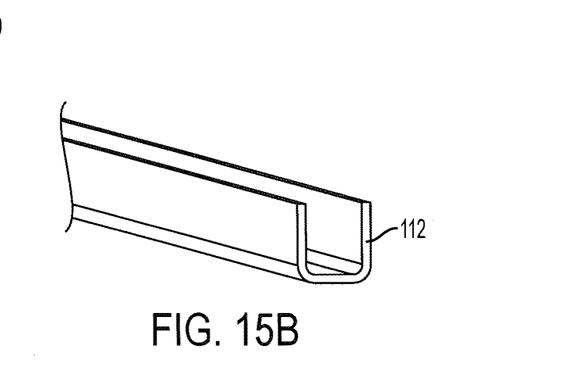
Figure 15C:
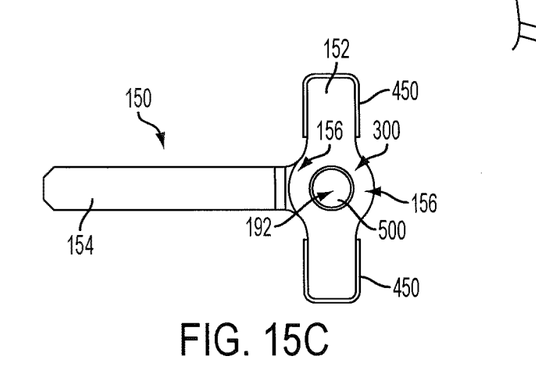
Figure 15D:
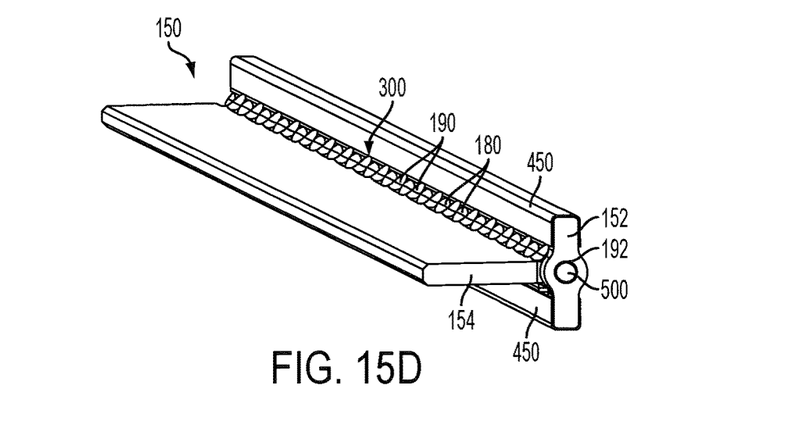
Figure 16D:
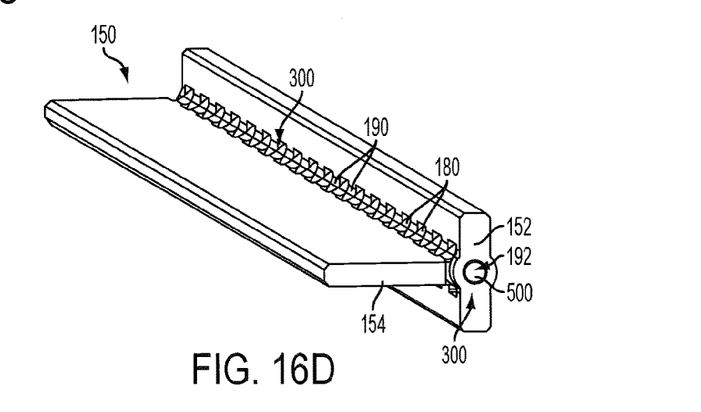

The slider arm member 154 is pivotably engaged with the slider body 152 at the hinge joint 300 substantially disposed within the track channel 110 such that the slider arm member 154 can rotate with respect to the slider body 152, which is substantially constrained within the track channel 110. According to an embodiment, as shown in FIGS. 11 (shown without the track assembly 106), 15D, and 16D, the slider arm member 154 may include a plurality of spaced-apart annular members 180, wherein each annular member 180 defines a slider arm aperture 182 (FIG. 11). The annular members 180 are arranged in serial alignment such that the slider arm apertures 182 are aligned along a longitudinal axis of the slider arm member 154. In such an embodiment, the slider body 152 may include a plurality of spaced-apart annular portions 190, wherein each annular portion 190 defines a slider body aperture 192. The annular portions 190 are arranged in serial alignment such that the slider body apertures 192 are aligned along a longitudinal axis Z of the slider assembly 150. According to an embodiment, the slider body 152 may be a single unitary workpiece. In another embodiment, the slider body 152 may be comprised of multiple components for providing the spaced-apart annular portions 190.

Each annular member 180 of the slider arm member 154 is configured for positioning between a pair of adjacent annular portions 190 of the slider body 152 such that the slider arm apertures 182 and the slider body apertures 192 are aligned in an alternating manner along the longitudinal axis Z of the slider assembly 150 so as to define a longitudinally extending hinge bore 550, which, in some instances, may be substantially cylindrical. That is, the slider arm apertures 182 and the slider body apertures 192 are positioned and aligned adjacently within the track channel 110 to form the hinge bore 550.

The slider assembly 150 may further include a hinge pin 500 configured to be received in the hinge bore 550 so as to hingedly and pivotably couple the slider body 152 to the slider arm member 154 such that the slider arm member 154 can pivot within the track channel 110. The slider body 152 and the slider arm member 154 may be detached from one another by removing the hinge pin 500 from the hinge bore 550 so as to be easily replaced.

The hinge joint 300 allows the slider arm member 154 to rotate while the slider body 152 remains in a position flat against the track liner member 112. In this manner, the bearing contact between the bearing member 400, 450 and the slider body 152 may be maximized. By positioning the hinge line of the hinge joint 300 centrally in the slider body 152, moment transfers from the slider arm member 154 to the slider body 152 can be reduced or even eliminated. The hinge joint 300 promotes equal distribution of loads to the track liner members 112 during hoop loading, which is a predominant loading condition. As such, the bearing surfaces of the bearing member 400, 450 may be normal to such a load direction, which may minimize the normal forces N, thereby reducing friction and wear.

Figure 13A:
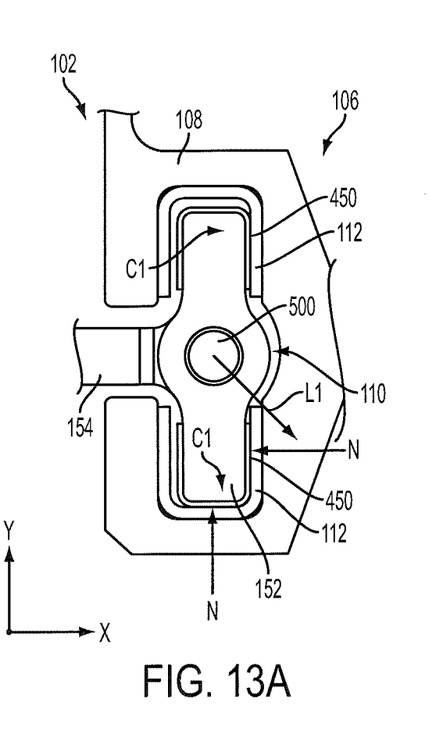
FIGS. 13A-13C are end views of a guide system in accordance with one embodiment of the present invention, illustrating the guide system reacting to various loads.
Figure 13B:
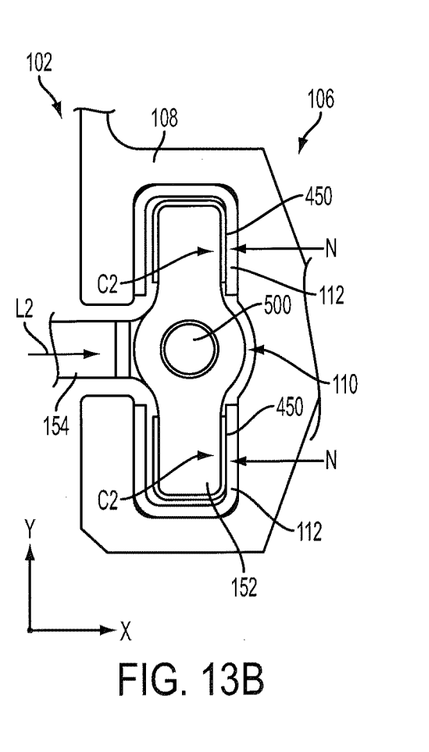
Figure 13C:
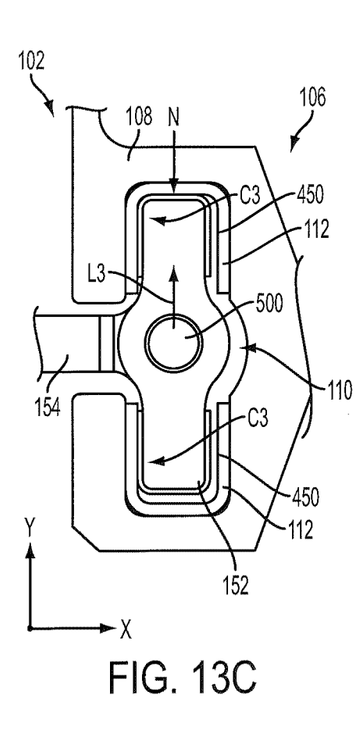

FIGS. 13A-13C illustrate the manner in which the slider body 152 interacts with the track liner member 112 within the track channel 110 under various loads, according to one embodiment of the present invention. In general, the track channel 110 and track liner member(s) 112 substantially constrain the slider body 152 in the X and Y directions while allowing the slider body 152 and the slider arm member 154 to translate along the Z axis (FIG. 8). The track channel 110 and track liner member(s) 112 also constrain the slider body 152 about the X and Y axes while allowing limited rotation about the Z axis (FIG. 8). In this regard, the guide system 102 may be tailored for various applied loads. In some instances, the slider arm member 154 is tensioned so as to be pulled in a direction outward of the track guide member 108.

FIG. 13A illustrates the guide system 102 reacting a load L1. In this regard, the slider body 152 having the bearing layer 450 contacts the track liner member 112 of the track guide member 108 primarily at a contact portions C1 proximate to lower and rear (i.e., opposite the slot 170) portions of the track channel 110. FIG. 11B illustrates the guide system 102 reacting a compression load L2. In this regard, the slider body 152 having the bearing layer 450 contacts the track liner member 112 of the track guide member 108 primarily at contact portions C2 at the rear portion (i.e., opposite the slot 170) of the track channel 110. FIG. 11C illustrates the guide system 102 reacting to an outward radial load L3. In this regard, the slider body 152 having the bearing layer 450 contacts the track liner member 112 of the track guide member 108 primarily at contact portions C3 proximate to upper and forward (i.e., proximate the slot 170) portions of the track channel 110.

Figure 14A:
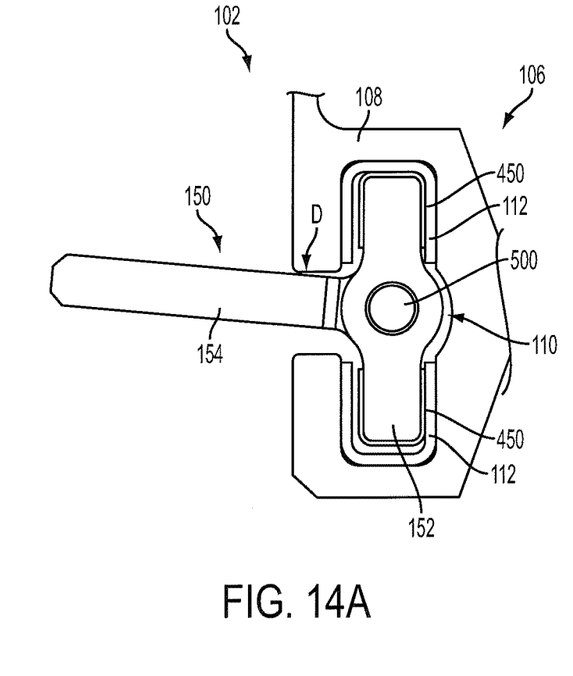
FIGS. 14A and 14B are end views of a guide system in accordance with one embodiment of the present invention, illustrating the rotation of a slider assembly of the guide system.
Figure 14B:
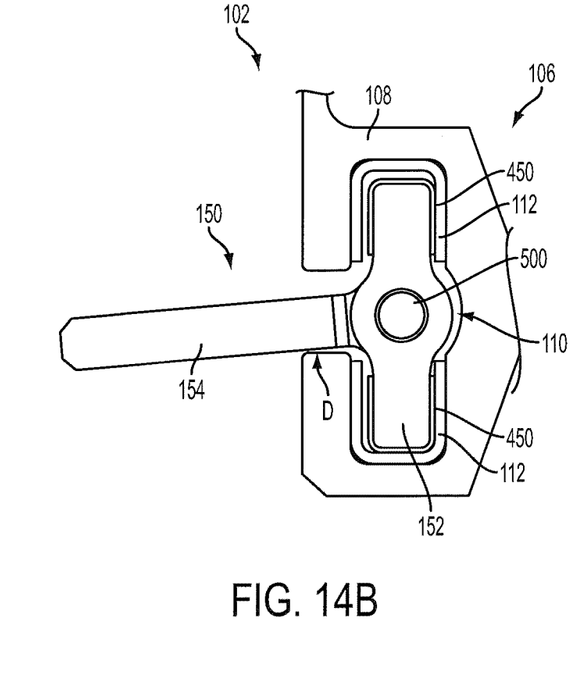

FIGS. 14A and 14B illustrate the rotation of the slider arm member 154 of the slider assembly 150 within the track channel 110. In some instances, the slider arm member 154 may be prevented from further rotation by interaction of the slider arm member 154 of the slider assembly 150 with the portion of the track guide member 108 defining the elongate slot 170. In other instances, as shown in FIGS. 14A and 14B, the slider assembly 150 may be configured such that the slider arm member 154 is prevented from contacting the track guide member 108 during operation. That is, the slider arm member 154 may be prevented from contacting the track guide member 108 at contact portion D during operation. In this regard, the annular members 180 of the slider arm member 154 interact with the slider body 152 to constrain rotation of the slider arm member 154 within predetermined limits such that the slider arm member 154 does not contact the track guide member 108.

FIGS. 15A-15D show one embodiment of the guide system 102 and its components, wherein a bearing material is provided on the slider body 152 of the slider assembly 150 as the slider bearing layer 450. That is, the bearing material is provided on the slider assembly 150, rather than on the track assembly 106.

FIGS. 16A-16D show another embodiment of the guide system 102 and its components, wherein a bearing material is provided on the track liner member 112 as the track bearing layer 400. In contrast to the embodiment shown in FIGS. 15A-15D, the bearing material is provided on the track assembly 106, rather than the slider assembly 150. The bearing material may be a low friction bearing material or any other suitable bearing materials, such as, for example, self-lubricating liner systems such as KARON (available from Kamatics Corporation), durable high-performance polymide-based polymers such as VESPEL (available from DuPont), and self-lubricating composites such as RULON (available from Saint-Gobain Performance Plastics).

Persons of ordinary skill in the art will understand that while the invention has been described in terms of various embodiments and various aspects and features, certain modifications, variations, changes and additions can be made to the described embodiments without departing from the spirit and scope of the invention. Such modifications, variations, changes and additions are intended to be within the scope of the appended claims.

What is claimed is:

1. A guide system for translating components of an aircraft engine nacelle, the guide system comprising:
a track assembly adapted to operably engage a first portion of a nacelle, the track assembly comprising a track guide member having a track channel; and
a slider assembly configured to translatably engage the track assembly, the slider assembly comprising a slider body configured to be received within the track channel, the slider assembly further comprising a slider arm member pivotably coupled to the slider body with a hinge joint disposed within the track channel, the slider arm member extending from the a portion of the slider body and outwardly of the track assembly.

2. The guide system according to claim 1 wherein the slider arm member comprises a plurality of spaced-apart annular members, each annular member defining a slider arm aperture, the annular members being arranged in serial alignment such that the slider arm apertures are aligned along a longitudinal axis of the slider arm member, and the slider body comprises a plurality of spaced-apart annular portions, each annular portion defining a slider body aperture, the annular portions being arranged in serial alignment such that the slider body apertures are aligned along a longitudinal axis of the slider body, each annular member of the slider arm member being configured for positioning between a pair of adjacent annular portions of the slider body such that the slider arm apertures and the slider body apertures are aligned along a longitudinal axis of the slider assembly to define a hinge bore, the slider assembly further comprising a hinge pin configured to be received in the hinge bore so as to hingedly couple the slider body to the slider arm member.

3. The guide system according to claim 1 wherein the track assembly further comprises at least one track liner member operably engaged with the track guide member about the track channel.

4. The guide system according to claim 1 wherein the track assembly further comprises first and second track liner members operably engaged with the track guide member in opposing relationship within first and second channel portions, respectively, of the track channel.

5. The guide system according to claim 1 wherein the slider arm member of the slider assembly extends outwardly of the track assembly via a slot defined by the track guide member, the slot being configured to permit rotation therewithin of the slider arm member substantially between about +/−5 degrees of a longitudinal axis of the track guide member.

6. The guide system according to claim 1 wherein the track assembly further comprises at least one track bearing layer operably engaged with the at least one track liner member about an interior surface thereof, the at least one track bearing layer being comprised of a low friction bearing material.

7. The guide system according to claim 1 wherein the slider assembly further comprises at least one slider bearing layer operably engaged with the slider body about an exterior surface portion thereof, the at least one slider bearing layer being comprised of a low friction bearing material.

8. The guide system according to claim 1 wherein the at least one track liner member is removably engaged with the track guide member.

9. A nacelle for a turbofan aircraft engine, the nacelle comprising:
a first nacelle portion;
a track assembly adapted to operably engage the first nacelle portion, the track assembly comprising a track guide member having a track channel;
a slider assembly configured to translatably engage the track assembly, the slider assembly comprising a slider body configured to be received within the track channel, the slider assembly further comprising a slider arm member pivotably coupled to the slider body with a hinge joint disposed within the track channel, the slider arm member extending from the a portion of the slider body and outwardly of the track assembly; and
a second nacelle portion operably engaged with the slider arm member of the slider assembly.

10. The nacelle according to claim 9 wherein the slider arm member comprises a plurality of spaced-apart annular members, each annular member defining a slider arm aperture, the annular members being arranged in serial alignment such that the slider arm apertures are aligned along a longitudinal axis of the slider arm member, and the slider body comprises a plurality of spaced-apart annular portions, each annular portion defining a slider body aperture, the annular portions being arranged in serial alignment such that the slider body apertures are aligned along a longitudinal axis of the slider body, each annular member of the slider arm member being configured for positioning between a pair of adjacent annular portions of the slider body such that the slider arm apertures and the slider body apertures are aligned along a longitudinal axis of the slider assembly to define a hinge bore, the slider assembly further comprising a hinge pin configured to be received in the hinge bore so as to hingedly couple the slider body to the slider arm member.

11. The nacelle according to claim 9 wherein the track assembly further comprises at least one track liner member operably engaged with the track guide member about the track channel.

12. The nacelle according to claim 9 wherein the track assembly further comprises first and second track liner members operably engaged with the track guide member in opposing relationship within first and second channel portions, respectively, of the track channel.

13. The nacelle according to claim 9 wherein the slider arm member of the slider assembly extends outwardly of the track assembly via a slot defined by the track guide member, the slot being configured to permit rotation therewithin of the slider arm member substantially between about +/−5 degrees of a longitudinal axis of the track guide member.

14. The nacelle according to claim 9 wherein the track assembly is translatable with respect to the slider assembly.

15. The nacelle according to claim 14 wherein the first nacelle portion is one of a translatable variable area fan nozzle section and a translatable thrust reverser sleeve.

16. The nacelle according to claim 9 wherein the slider assembly is translatable with respect to the track assembly.

17. The nacelle according to claim 16 wherein the second nacelle portion is one of a translatable variable area fan nozzle section and a translatable thrust reverser sleeve.

18. A nacelle for a turbofan aircraft engine, the nacelle comprising:
a stationary first nacelle portion;
a stationary track assembly operably engaged with the stationary first nacelle portion, the track assembly comprising a track guide member having a track channel;
means for slidably engaging one of a translatable variable area fan nozzle section and a translatable thrust reverser sleeve to the stationary track assembly;
means for pivoting, within the track channel, the means for slidably engaging the one of a translatable variable area fan nozzle section and a translatable thrust reverser sleeve to the stationary track assembly; and
means for actuating the means for slidably engaging the one of the translatable variable area fan nozzle section and the translatable thrust reverser sleeve.

19. The nacelle according to claim 18 wherein the means for slidably engaging the one of the translatable variable area fan nozzle section and the translatable thrust reverser sleeve comprises a slider assembly configured to slidably engage the track assembly, the slider assembly comprising a slider body configured to be received within the track channel, the slider assembly further comprising a slider arm member pivotably coupled to the slider body with a hinge joint disposed within the track channel, the slider arm member extending from the slider body and outwardly of the track assembly, and the slider arm member being operably engaged with the one of the translatable variable area fan nozzle section and the translatable thrust reverser sleeve.

20. The nacelle according to claim 19 wherein the means for pivoting, within the track channel, the means for slidably engaging the one of the translatable variable area fan nozzle section and the translatable thrust reverser sleeve to the stationary track assembly comprises a plurality of spaced-apart annular members formed on the slider arm member, each annular member defining a slider arm aperture, the annular members being arranged in serial alignment such that the slider arm apertures are aligned along a longitudinal axis of the slider arm member, and the slider body comprises a plurality of spaced-apart annular portions, each annular portion defining a slider body aperture, the annular portions being arranged in serial alignment such that the slider body apertures are aligned along a longitudinal axis of the slider body, each annular member of the slider arm member being configured for positioning between a pair of adjacent annular portions of the slider body such that the slider arm apertures and the slider body apertures are aligned along a longitudinal axis of the slider assembly to define a hinge bore, the slider assembly further comprising a hinge pin configured to be received in the hinge bore so as to hingedly couple the slider body to the slider arm member.

* * * * *